United States Patent

Korodi et al.

[15] 3,675,946
[45] July 11, 1972

[54] IMPACT FIFTH WHEEL

[72] Inventors: Miklos B. Korodi, New York, N.Y.; Clarence R. Runyan, Holland, Mich.

[73] Assignee: Holland Hitch Company, Holland, Mich.

[22] Filed: March 2, 1971

[21] Appl. No.: 120,089

[52] U.S. Cl. ............................................. 280/440, 280/407
[51] Int. Cl. ............................................................ B62d 53/00
[58] Field of Search ................................. 280/440, 438 R

[56] References Cited

UNITED STATES PATENTS

| | | | |
|---|---|---|---|
| 2,289,079 | 7/1942 | Seyferth | 280/440 |
| 2,531,871 | 11/1950 | Braunberger | 280/440 |
| 2,779,605 | 1/1957 | Braunberger | 280/440 |
| 2,880,681 | 4/1959 | Markestein | 280/440 X |
| 3,309,111 | 3/1967 | Vaugoyeau | 280/438 R |
| 3,399,907 | 9/1968 | Hein | 280/440 |

*Primary Examiner*—Leo Friaglia
*Attorney*—Price, Heneveld, Huizenga & Cooper

[57] ABSTRACT

A fifth wheel assembly for trucks wherein the fifth wheel is pivotally supported on a pair of laterally spaced mounts, each having an enclosure with an open bottom and sloping front and rear surfaces, a laminated insert of bonded alternate viscoelastic layers and metal layers in each enclosure, having a stepped construction, with connection means at the bottom of each insert, and connection means at the top of each insert attached to the enclosure.

5 Claims, 5 Drawing Figures

INVENTORS
MIKLOS B. KORODI
CLARENCE R. RUNYAN
BY
ATTORNEYS

INVENTORS
MIKLOS B. KORODI
CLARENCE R. RUNYAN

BY

ATTORNEYS

IMPACT FIFTH WHEEL

BACKGROUND OF THE INVENTION

This invention relates to a vehicular fifth wheel assembly, and more particularly to such an assembly having cushioned engagement.

The coupling engagement between the fifth wheel on a truck tractor and a king pin on a trailer is normally accomplished by backing the tractor until the fifth wheel couples onto the king pin. To assure complete engagement between these components, the driver commonly causes the fifth wheel to engage the king pin with significant force. This is done by backing the truck tractor into engagement with the trailer with significant speed. This is necessary because the latch on the fifth wheel requires significant impact to momentarily shift it against its internal biasing forces that bias it to closed position for effective coupling around the king pin.

Over the years, several proposals have been advanced for modified fifth wheel structures employing various types of cushioning during coupling. The cushioning action was desired because the sharp coupling impact commonly occurring is too frequently much greater than required for coupling. This causes excessive wear and damage to fifth wheel, bracket, and king pin components, but more importantly, causes damage to the tractor drive train, particularly the clutch and rear transmission, due to the sudden stops while under power.

However, providing cushioning action to the fifth wheel assembly, as in the prior art structures, is not enough for an effective, practical construction on a truck tractor fifth wheel. Specifically, it has been determined that cushioned fifth wheels too often do not latch effectively when the tractor is backed to the trailer for coupling. This happens even if the tractor is backed to the trailer at substantial speeds. The cushioned fifth wheel springs toward the cab under the impact and bounces back without the latch being sprung open to clamp onto the king pin. Of course, if the latch could be separately operated, e.g. manually, as is done on piggy back railway car units, rather than with backing of the tractor, this presents no problem. But, this is not normally practical or acceptable for everyday trucking operations.

SUMMARY OF THE INVENTION

An object of this invention is to provide a novel cushioned fifth wheel assembly for a truck tractor. The assembly effectively cushions the coupling impact between a moving tractor and a stationary trailer, to prevent undue wear and/or damage to the hitch assembly and the drive train components, but also causes effective latching therebetween. The novel fifth wheel assembly achieves both of these important results, while also being relatively simple in construction, without complex metallic spring components and mounting arrangements to alter the basic design and/or height of the fifth wheel on the tractor.

These and other objects, advantages, and features of the invention will be apparent upon studying the following specification in conjunction with the drawings.

DESCRIPTION OF THE PREFERRED EMBODIMENT

Figure 1:
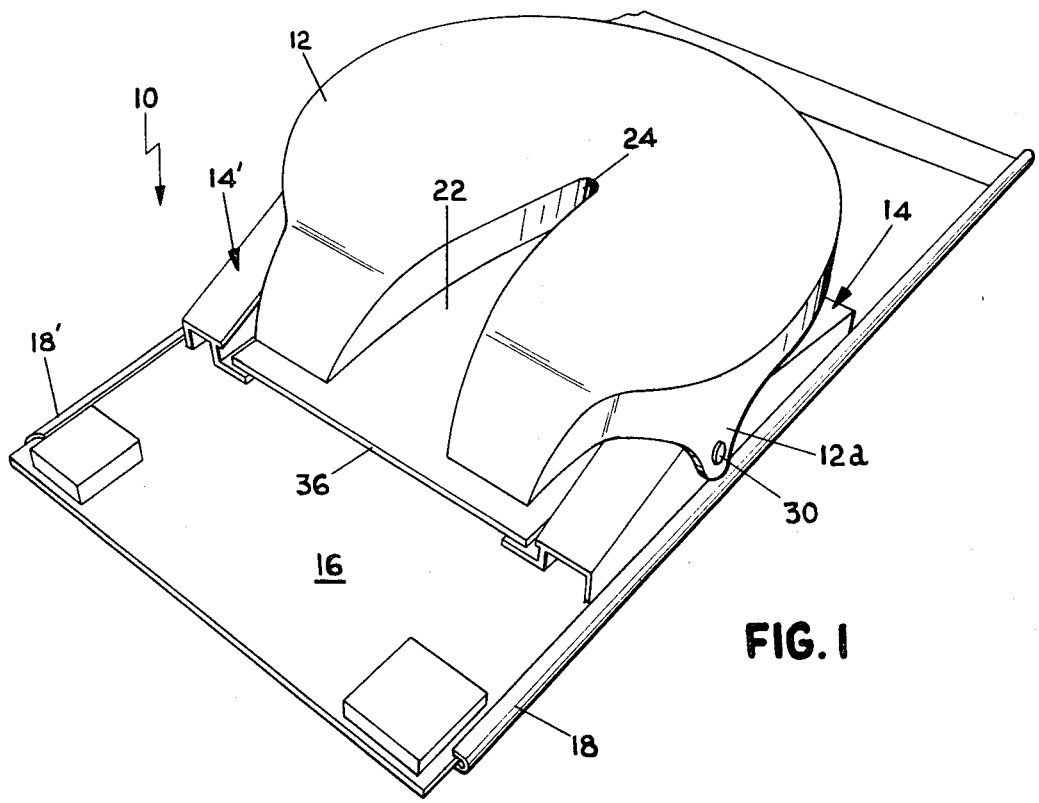
FIG. 1 is a perspective view of a truck tractor fifth wheel assembly employing the invention.

Referring now specifically to the drawings, the fifth wheel assembly 10 there shown includes fifth wheel plate 12 pivotally mounted on a pair of spaced laterally positioned fifth wheel mounts 14 and 14', said mounts being illustrated as attached to underlying plate 16, which is supported within tracks 18 and 18' affixed to frame members 20 of a truck tractor bed, the truck tractor being conventional and therefore not illustrated in detail.

Fifth wheel 12 may be any of several known types. It includes a latching mechanism of the type which is shifted to open position by the entering king pin and is biased by spring means to closed position, as illustrated for example in U.S. Pat. No. 3,013,815. Hence, the rear of the fifth wheel is slotted with a forwardly convergent slot 22 terminating in a king pin receiving recess 24.

Figure 2:
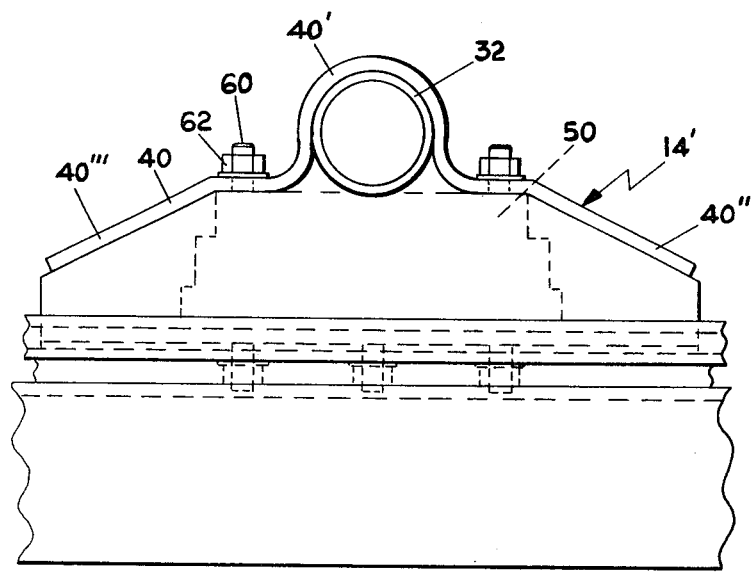
FIG. 2 is a fragmentary, enlarged, side elevational view of a portion of the fifth wheel assembly in FIG. 1.

Depending from each of the opposite lateral sides of fifth wheel plate 12 is a pair of spaced mounting flanges 12a of conventional type, each pair of which straddles the respective ones of the mounts 14 and 14'. Likewise, in conventional fashion, a pair of pins 30 extend transversely through the depending flanges 12a and through cylindrical bearing sockets 32 (FIG. 2) on the upper surfaces of mounts 14 and 14', coaxially with each other, to pivotally support the fifth wheel in a manner allowing it to be tilted angularly fore and aft.

It is important to this invention that the mounts 14 and 14' be particularly assembled and attached to the underlying structure. This underlying structure may include for example a plate 16 as illustrated, although it will be obvious to those in the art that other types of underlying substructure may be employed. Using this particular type of plate construction, each of mounting means 14 and 14' is fixedly attached to plate 16 with plate 16 opposite edges extending into inwardly oriented generally U-shaped tracks 18 integral with underlying plate 18'. Plate 18' is mounted on its opposite edges to the opposite L-shaped frame members of the truck tractor frame or bed. Also, preferably the spaced mounts 14 and 14' are reinforced by an interconnecting reinforcing plate 36.

Figure 3:
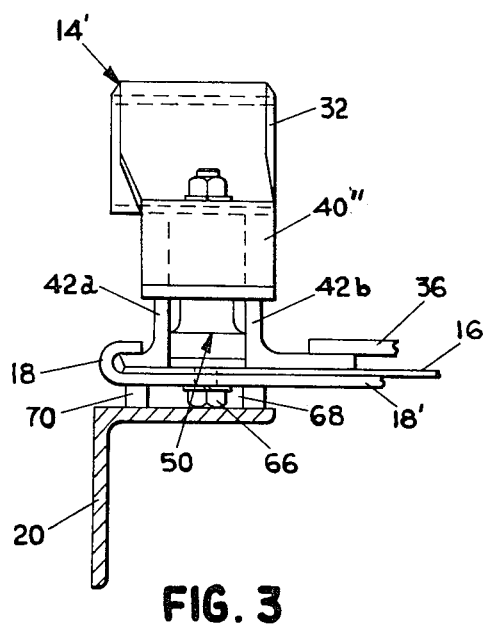
FIG. 3 is a fragmentary, enlarged, end elevational view of the apparatus in FIG. 2.

According to this invention, each of the fifth wheel mounts 14 and 14' includes an enclosure with a top portion and an open bottom. The pivotal bearing socket 32 for the fifth wheel mount is on the top portion, having bearing 32 secured by a looped portion 40' of a metal plate 40 which also forms a front surface 40" and a rear surface 40"' for the enclosure. Front and rear surfaces 40" and 40"' slope diagonally downwardly, and also frontwardly and rearwardly, respectively. These plates on the respective mounts 14 and 14' are weldably attached to a pair of spaced upstanding side plates 42a and 42b. Plate 42a preferably has an outwardly horizontally extending flange that protrudes into guide 18, and plate 42b has an inwardly extending flange resting upon plate 16 and protruding beneath a lateral side edge of plate 36 (FIG. 3).

Figure 4:
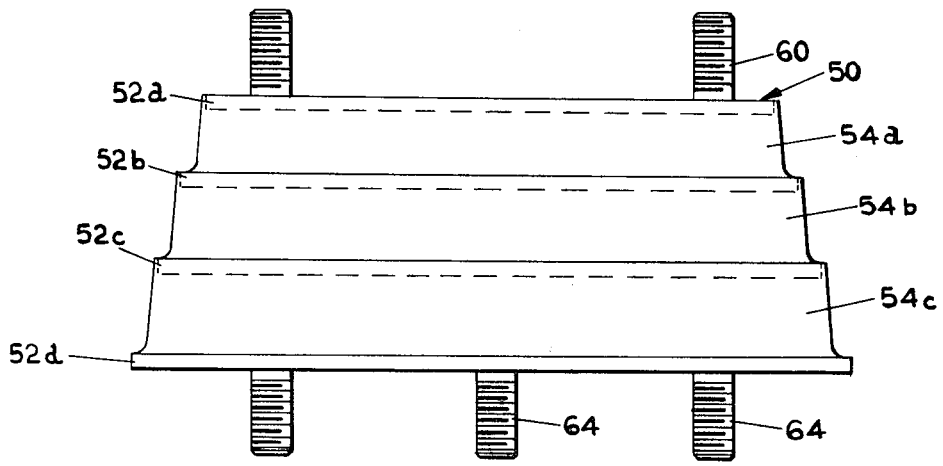
FIG. 4 is a side elevational enlarged view of one of the inserts in the mount assembly.
Figure 5:
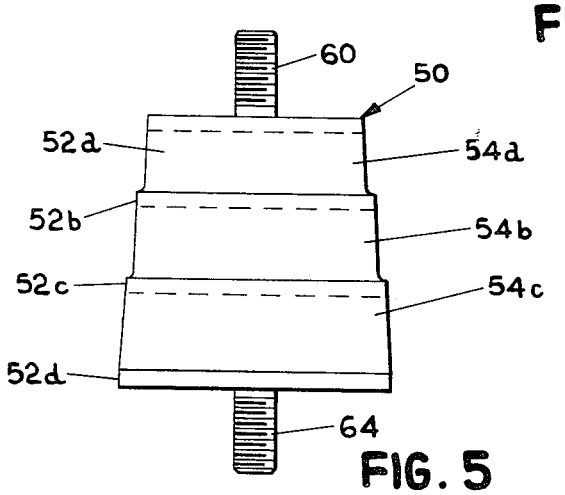
FIG. 5 is an enlarged, end elevational view of the insert in FIG. 4.

Within each of these two enclosures for the respective mounts 14 and 14' is a laminated metal and rubber insert 50. Each insert includes a plurality of horizontally extending, vertically spaced metal layers elongated in the front to rear direction, interspersed by plurality of resilient layers bonded to the metal. Specifically, in the embodiment illustrated, there is an upper metal plate 52a, a pair of intermediate metal plates 52b and 52c and a lower metal plate 52d, with three viscoelastic damping material layers 54a, 54b, and 54c between and bonded to the metal plates 52a and 52b, 52b and 52c, and 52c and 52d, respectively. This laminated construction is preferably formed in a manner set forth in U.S. Pat. No. 3,079,277. The metal layers, from bottom to top, are preferably consecutively reduced in length and in width. The consecutive viscoelastic layers are also preferably reduced in length and width from bottom to top as is fully illustrated in FIGS. 4 and 5. The viscoelastic damping materials employed are well-known, as set forth for example in British Pat. No. 513,171. These possess high mechanical hysteresis i.e. internal friction and also have a low modulus of elasticity compared to structural materials such as the rigid, separating metal plates to which these layers are attached.

Secured to upper plate 52a of each insert is a pair of threaded studs 60 which extend upwardly through plate 40 forming the top portion of the mount enclosure, for securement of nuts 62 thereon. Extending downwardly from lower plate 52d of each insert is a plurality of (here three) studs 64 protruding through plate 18' for attachment of nuts 66. A special recess 68 is provided between frame member 20 and plate 18' by spacers 70 for attachment of nuts 66 as illustrated in FIG. 3.

In use of the novel assembly, it has been found that the truck tractor can be backed up with considerable speed into the king pin on the trailer, causing the fifth wheel and king pin to slam together with considerable impact, yet without damage to the fifth wheel or trailer connecting mechanism, or to the drive train assembly of the truck tractor. The assembly provides an effective cushioning action in this regard. Yet, contrary to prior cushioned units on truck tractors, the cushioning action does not prevent the fifth wheel latching mechanism from being effectively biased momentarily to its open position so that the king pin can be received and clamped. Repeated experimentation with this mechanism has shown it to be completely effective in accomplishing both of these results, yet with this relatively simple construction. The device therefore provides an answer to a particular problem which has bothered and created expense for the trucking industry for a long time.

It is conceivable that certain minor details of construction may be modified without departing from the scope of the concept herein. Particularly, the underlying structure below the mounts can be varied consideraly to suit the particular tractor frame assembly and desired fifth wheel adjustability. Hence, it is intended that the invention herein is not to be limited particularly to the preferred embodiment disclosed as illustrative, but only by the scope of the appended claims and reasonable equivalents to those structures defined therein.

The embodiments of the invention in which an exclusive property or privilege is claimed are defined as follows.

1. A truck tractor fifth wheel assembly comprising: a pair of spaced fifth wheel mounts having transversely oriented pivot connections at the top thereof, and a fifth wheel pivotally supported thereon; said fifth wheel having latch mechanism operable to be opened by the force of an entering king pin for latching thereto; each of said fifth wheel mounts including an enclosure with a top portion and an open bottom; a laminated insert in each said enclosure, having connection means on the bottom thereof for attachment to an underlying support, and connection means at the top thereof securing said insert to said enclosure top portion; and said laminated insert having alternate bonded rigid and viscoelastic layers on top of each other from said bottom connection means to said top connection means, to sustain vertical load in compression and horizontal load in shear.

2. The fifth wheel assembly in claim 1 wherein each of said mount enclosures is elongated fore to aft, and each of said laminated inserts is elongated fore to aft.

3. The fifth wheel assembly in claim 1 wherein each of said laminated inserts has a stepped construction, bottom to top, on the front and back ends thereof.

4. The fifth wheel assembly in claim 3 wherein each of said mount enclosures is elongated fore to aft, each of said laminated inserts is elongated fore to aft, and said stepped construction has its widest portion at the bottom and its smallest portion at the top.

5. The fifth wheel assembly in claim 4 wherein each of said mount enclosures has front and rear surfaces adjacent said insert front and back ends and sloping diagonally downwardly and also forwardly and rearwardly, respectively.

* * * * *